(12) United States Patent
Su et al.

(10) Patent No.: US 7,370,144 B2
(45) Date of Patent: May 6, 2008

(54) METHOD AND SYSTEM FOR ACCESSING A TARGET SAMPLE IN A MEDIA DATA STREAM

(75) Inventors: Chan-Hung Su, Kaohsiung (TW); Yu-Cheng Hsieh, Jen-Wu Hsiang (TW)

(73) Assignee: Mediatek, Inc., Hsin-Chu (TW)

( * ) Notice: Subject to any disclaimer, the term of this patent is extended or adjusted under 35 U.S.C. 154(b) by 277 days.

(21) Appl. No.: 11/230,402

(22) Filed: Sep. 20, 2005

(65) Prior Publication Data

US 2007/0067568 A1    Mar. 22, 2007

(51) Int. Cl.
*G06F 12/02* (2006.01)
(52) U.S. Cl. ...................... 711/113; 709/231
(58) Field of Classification Search ............ None
See application file for complete search history.

(56) References Cited

U.S. PATENT DOCUMENTS

| | | | |
|---|---|---|---|
| 5,604,499 A | 2/1997 | Miyagoshi et al. | |
| 6,008,745 A | 12/1999 | Zandi et al. | |
| 6,157,929 A * | 12/2000 | Zamiska et al. | 707/200 |
| 2003/0079222 A1* | 4/2003 | Boykin et al. | 725/31 |
| 2004/0205224 A1* | 10/2004 | Jones et al. | 709/231 |

FOREIGN PATENT DOCUMENTS

| | | |
|---|---|---|
| WO | WO9846005 | 10/1998 |
| WO | WO03034746 | 4/2003 |

OTHER PUBLICATIONS

"Proposed Revised Common Text Multimedia File Format Specification" Singer et al., Apr. 30, 2003.
European Search Report mailed Nov. 16, 2006.

* cited by examiner

*Primary Examiner*—T Nguyen
(74) *Attorney, Agent, or Firm*—Thomas, Kayden, Horstemeyer & Risley

(57) ABSTRACT

Data processing methods and systems for accessing a target sample in a media data stream. The media data stream has a plurality of samples and corresponding sample information recorded in at least one entry, wherein the sample information for a predetermined number of the entries is calculated and the calculated result is stored in at least one cache entry. Target sample information corresponding to the target sample is provided. One of the cache entries is located by comparing the target sample information with the calculated result of respective cache entries. After locating the cache entry, the target sample from the entries is located corresponding to the located cache entry.

19 Claims, 8 Drawing Sheets

| BOX TYPE | 'stts' |
|---|---|
| Entry Count | 5 |
| Sample Count | SAMPLE-DELTA |
| 6 | 66 |
| 14 | 67 |
| 11 | 63 |
| 2 | 64 |
| 12 | 66 |

| BOX TYPE | 'stss' |
|---|---|
| Entry Count | 6 |
| SAMPLE NUMBER ||
| 1 ||
| 8 ||
| 16 ||
| 24 ||
| 31 ||
| 38 ||

| BOX TYPE | 'stsc' | |
|---|---|---|
| Entry Count | 4 | |
| FIRST CHUNK | SAMPLE PER CHUNK | SAMPLE DESCRIPTIOM INDEX |
| 1 | 3 | 1 |
| 3 | 4 | 2 |
| 6 | 7 | 3 |
| 9 | 6 | 4 |

METHOD AND SYSTEM FOR ACCESSING A TARGET SAMPLE IN A MEDIA DATA STREAM

BACKGROUND

The present disclosure relates generally to data processing, and more particularly to methods and systems for processing and accessing metadata in a media file.

Media files, such as MPEG-4 files, comprise media data and metadata of the media data. The metadata provides data sample information to media applications for processing media data in the file. Media files are defined to be organized with several structural elements. For example, MPEG-4 files are composed of structural elements called boxes. Each box may comprise media data, metadata or other sub-boxes. For example, a sample table box (STBL) records time information and file information of media data. According to the information recorded in the STBL box, applications can obtain the time, type, data size, and position in the media file and further perform the playback, random-seek or other functions toward the media file, accordingly. The STBL box also includes several sub-boxes comprising a decoding time to sample box (STTS) as shown in FIG. 1, a sample size box (STSZ), a sample to chunk box (STSC) as shown in FIG. 3, a chunk offset box (STCO), a sync sample box (STSS) as shown in FIG. 2, sample description table (STSD), and others.

The STTS box contains at least one entry for recording the time duration of samples of media data. FIG. 1 shows a STIS box 100, comprising 5 entries storing total 45 samples in the media data. It should be noted that data in the STTS box is recorded using the technique of run-length coding to reduce the storage space thereof. That is, the time duration for media sample #1~190 6, #7~#20, #21~#31, #32~#33, and #34~#45 is 66, 67, 63, 64, and 66 time units, respectively, and the total time duration of the 45 sample of the media data is 2947 time units.

Traditionally, a linear search through these boxes is performed to help locating a specific sample with a target decoding time. A linear search means that the time duration of respective samples from the very first media sample is accumulated until the accumulated time duration equals or exceeds the target decoding time. For example, to locate a specific sample with a specific decoding time of time unit 2000, a linear search is performed by accumulating the time duration of the first thirty samples. Since the total time duration of the first thirty samples is 1964 (6*66+14*67+10*63=1964) and the total time duration of the first thirty-one samples is 2027 (6*66+14*67+11*63=2027) which exceeds the specific decoding time 2000, sample #30 is then located. The linear search calculation is time-consuming if there is large number of entries in these boxes.

In addition, the media samples in the media data are grouped into chunks. The STSC box records the mapping relationship between samples and chunks. Based on the mapping relationship recorded in the STSC box, one can identify in which chunk a target sample resides, and further obtain other related data using the chunk information. FIG. 3 shows a STSC 300, in which the number of samples in chunk #1~#2, chunk #3~#5, chunk #6~#8, and chunk #9 and the latter is 3, 4, 7, and 6, respectively. Data in the STSC is recorded using the technique of run-length coding to reduce the storage space thereof. To locate a specific sample, a specific chunk corresponding to the specific sample is sought by performing a linear search by accumulating the number of samples from the first chunk. The calculation is also time-consuming if the number of entries in the STSC box is large.

SUMMARY

Data processing methods and systems are provided.

In an embodiment of a data processing method for accessing a target sample in a media data stream, information corresponding to the target sample is provided. The media data stream has a plurality of samples, wherein the sample information for a predetermined number is calculated and the calculated result is stored in at least one cache entry. One of the cache entries is located by comparing the target sample information with the calculated result of respective cache entries. After locating the cache entry, the target sample can be rapidly located among the samples corresponding to the located cache entry.

An embodiment of a data processing system comprises a media data stream, at least one cache entry, and a processing unit. The media data stream comprises a plurality of samples. The sample information for a predetermined number is calculated and the calculated result is stored in the cache entry. The processing unit receives target sample information corresponding to a target sample, locates one of the cache entries by comparing the target sample information with the calculated result of respective cache entries, and after locating the cache entries, rapidly locates the target sample among the samples corresponding to the located cache entry.

Data processing methods may take the form of program code embodied in a tangible media. When the program code is loaded into and executed by a machine, the machine becomes an apparatus for practicing the disclosed method.

DESCRIPTION OF THE DRAWINGS

The invention will become more fully understood by referring to the following detailed description with reference to the accompanying drawings, wherein:

FIG. 1 shows an example of a STTS box;

FIG. 2 shows an example of a STSS box;

FIG. 3 shows an example of a STSC box;

DESCRIPTION

Data processing methods and systems are provided, in which pre-processed cache entry, shared cache pool and incremental processing are employed. In the following embodiments, the data processing methods and systems are used to decode MPEG-4 files, which is well-defined in ISO standard and is however not limited in the present invention. An overview of the MPEG-4 files is provided in a standard specification of ISO 14496-12, which is incorporated herein by reference in its entirety for all purposes.

Figure 4:
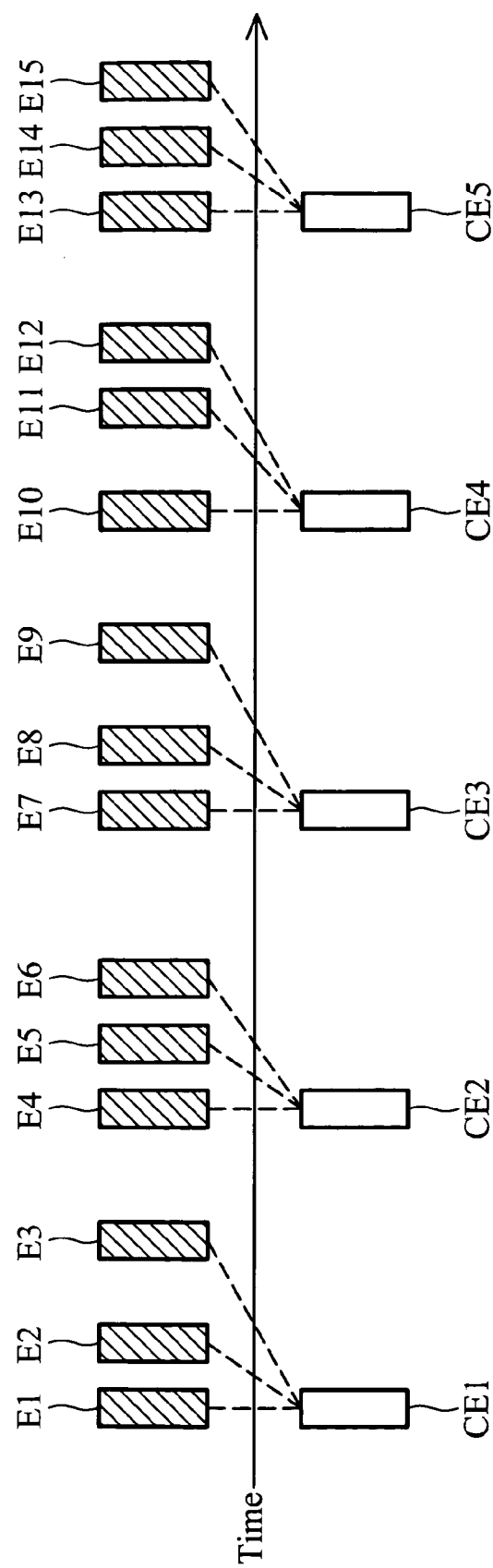
FIG. 4 is a schematic diagram illustrating an embodiment of entries in the STTS box and its corresponding pre-calculated cache entries.

Pre-Procesed Cache Entry:

FIG. 4 is a schematic diagram illustrating an embodiment of entries in the STTS box and its corresponding pre-processed cache entries. Each cache entry records the accumulated total time duration of a group of STTS entries. The former group of STTS entries is a sub-set of the latter groups. As shown in FIG. 4, the accumulated time duration and sample count of the STTS entries E1, E2 and E3 are recorded by cache entry CE1, the accumulated time duration and sample count of the STTS entries E1 to E6 are recorded by cache entry CE2, the accumulated time duration and sample count of the STTS entries E1 to E9 are recorded by cache entry CE3, the accumulated time duration and sample count of the STTS entries E1 to E12 are recorded by cache entry CE4, and the accumulated time duration and sample count of the STTS entries E1 to E15 are recorded by cache entry CE5. For example, if STTS entry E4 records 3 samples and the time duration of each is 5, STTS entry E5 records 5 samples and the time duration of each is 10, and STTS entry E6 records 7 samples and the time duration of each is 8, the cache entry CE2 is the time duration recorded in CE1 plus the total time duration of 15 samples (121), and the sample count recorded in cache entry CE2 is the sample count recorded in CE1 plus 15. The calculation for other cache entries is similar thereto. It should be noted that the calculation of the cache entries could be calculated in advance.

To locate the sample data with the specific decoding time T, the cache entry $CE_N$ is checked, such that the duration recorded in $CE_N$ is greater than T and the duration recorded in $CE_{N-1}$ is smaller than T. In some embodiments, the cache entry can be located by a binary search. If $CE_{N-1}$ records the time duration from $E_1$ to $E_x$, and $CE_N$ records the time duration from $E_1$ to $E_y$, it is trivial that the sample data which we are looking for must resides in the STTS entries $E_x$ to $E_y$. Then a linear search is applied in the STTS entries $E_x$ to $E_y$ to locate the wanted sample data.

To obtain the decoding time of a specific sample data $S_K$, the similar method applies. The cache entry $CE_N$ is checked such that the accumulated sample count recorded in $CE_N$ is greater than K and the accumulated sample count recorded in $CE_{N-1}$ is smaller than K. In some embodiments, the cache entry can be located by a binary search. If $CE_{N-1}$ records the sample count from $E_1$ to $E_x$, and $CE_N$ records the sample count from $E_1$ to $E_y$, it is trivial that the sample data which we are looking for must resides in the STTS entries $E_x$ to $E_y$. Then a linear search is applied in the STTS entries $E_x$ to $E_y$ to locate the wanted sample data and it's decoding time.

With the use of the pre-calculated cache, the frequencies of accessing media files can be greatly reduced since the pre-calculated data can be stored in memory. It is also understood that the pre-processed cache entry can be also applied to STSS and STSC. In STSC, the cache entry records the total number of samples in the chunks covered by the current and prior cache entries.

Shared Cache Pool:

In some embodiments, the number of corresponding cache entries to each box might be either fixed or dynamically decided according to each box size.

In some embodiments, the total size of cache memory might be limited and the allocation of the cache entries for each box can be determined using a shared cache pool model. In the shared cache pool, the number of cache entries for a box is determined according to the number of entries in the boxes requiring cache entries in the order of initialization. For example, to allocate a certain amount of cache entries to the STTS box, the STSS box and the STSC box, the system will firstly allocate a first ratio of the cache entries to the STSS box. The first ratio could be the number of STSS entries divided by the total entry count of the 3 tables. In some embodiments, the number of cache entries allocated to the STSS box can be further limited to a pre-defined maximum number. Then, the system will allocate a second ratio of the cache entries to the STSC box. The second ratio could be the number of STSC entries divided by the total entry count of the 3 tables. In some embodiments, the number of cache entries allocated to the STSC box can also be further limited to a pre-defined maximum number. Finally, the system will allocate the rest of the cache entries to the STTS box. It should be noted that the order of cache allocation is not limited in the present invention. Any order of cache allocation should be covered in the present invention.

Incremental Processing:

As mentioned above, with the pre-calculated cache entries, lots of time spent on redundant computation can be reduced. However, if the boxes (STTS, STSS and STSC) are very large, the calculation of cache entries will need a certain amount of time. For example, if complete cache entries for the STTS box must be prepared before a playback, the accumulated total time duration of a group of STTS entries for respective cache entries must be calculated. To reduce the response time caused by calculation of cache entries before playback, the calculation of cache entries is performed with the concept of incremental processing. In incremental processing, a part of the cache entries is calculated before the playback of media data, and the rest of the cache entries are calculated progressively during playback. If the target sample data sought by users is not found in the currently ready cache entries, the calculation of cache entries is performed forward until the data is covered by the cache entries.

Figure 5A:
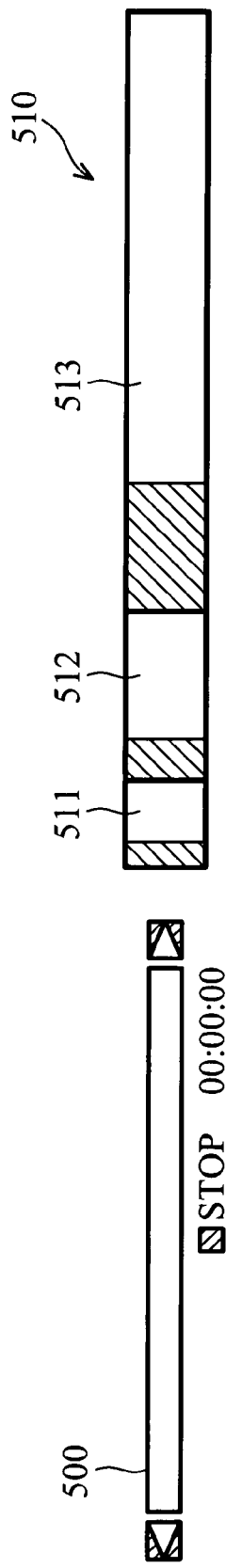
FIGS. 5A~5D shows an example of incremental processing.
Figure 5B:
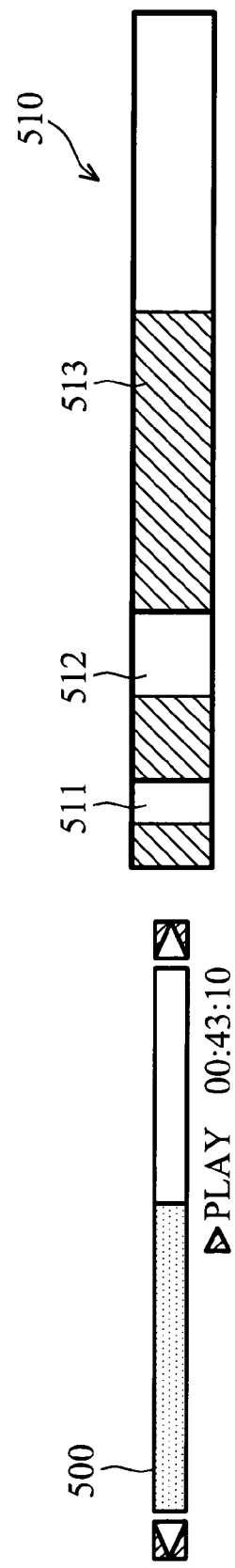
Figure 5C:
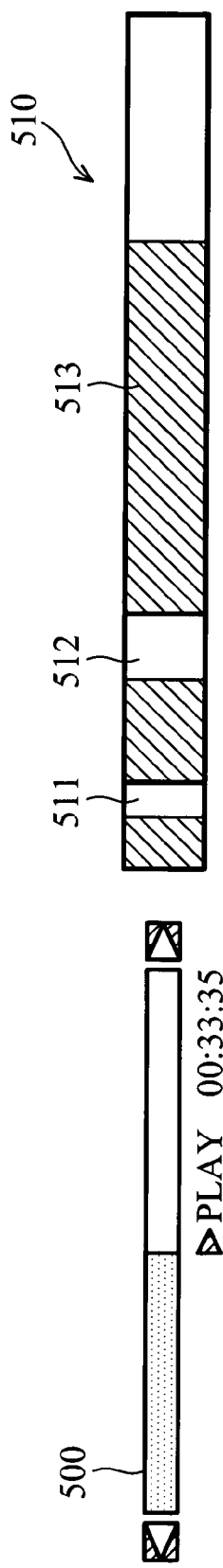
Figure 5D:
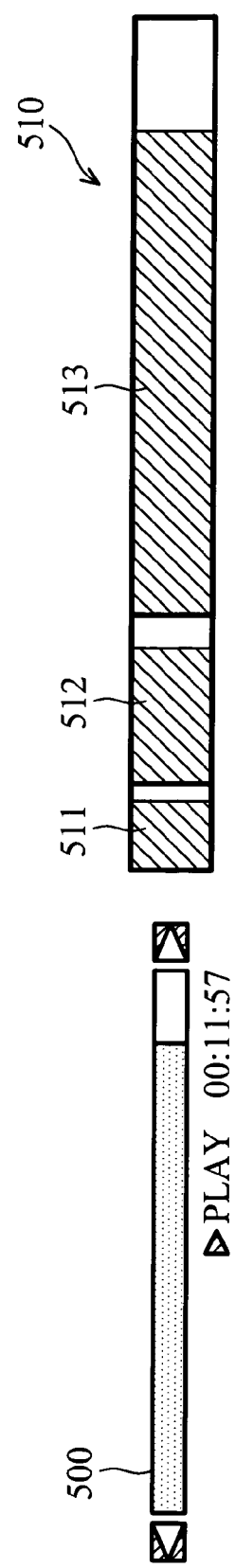

FIGS. 5A~5D shows an example of incremental processing. In this example, the memory space 511 of the memory 510 is allocated to the STSS box for its corresponding cache entries, the memory space 512 of the memory 510 is allocated to the STSC box for its corresponding cache entries, and the memory space 513 of the memory 510 is allocated to the STTS box for its corresponding cache entries. As shown in FIG. 5A, before the playback of media data (see playback status 500), only a part of the cache entries are is calculated. The rest of the cache entries for respective boxes are calculated progressively during playback, as shown in FIG. 5B. Since the calculation is accomplished progressively during playback, each time only a small part of the cache entries is calculated (as shown in FIG. 5C), no time delay in playback will be noticed by users. If a target decoding time prior to current decoding time is sought, since the required data can be found in the calculated cache entries, no time delay will be noticed by users. If a target decoding time is sought and the required data is not found in the calculated cache entries, the calculation of cache entries is performed forward until the data is covered by the cache entries, as shown in FIG. 5D.

Figure 6:
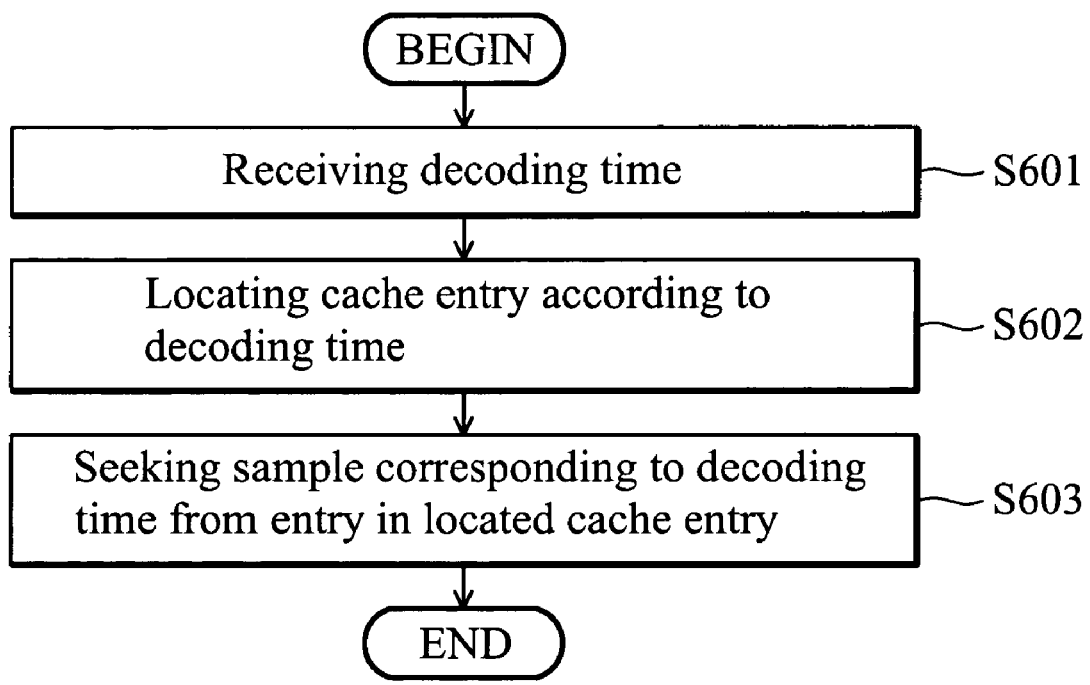
FIG. 6 is a flowchart showing an embodiment of a data processing method.

FIG. 6 is a flowchart showing an embodiment of a data processing method. In this embodiment, a STTS box is used as an example, rather than a limitation to the invention. To locate a sample data with the specific decoding time received in step S601, in step S602, one of the cache entries is firstly located. In this embodiment, binary search is used as an example, rather than a limitation to the invention. In step S603, after locating the cache entry, the method of the present invention only needs to search through the group corresponding to the cache entry for the target sample by accumulating the time durations of respective samples in the STTS entries until the sum of the accumulated time duration of samples equals or exceeds the target decoding time. Therefore, the total search time can be reduced. It is understood that if the sample is sought for playback, it is also further determined whether the sample can be randomly accessed. As described, there are random accessible samples and non-random accessible samples among the media data. A random accessible sample means the sample can be sought and decoded without regard to other samples. If the desired sample is not a random accessible one, a random access point (random accessible sample) closest to (equal to or less than) the sample is sought from the STSS, and a decoding process begins from the random accessible sample, until the desired sample is encountered.

Figure 7:
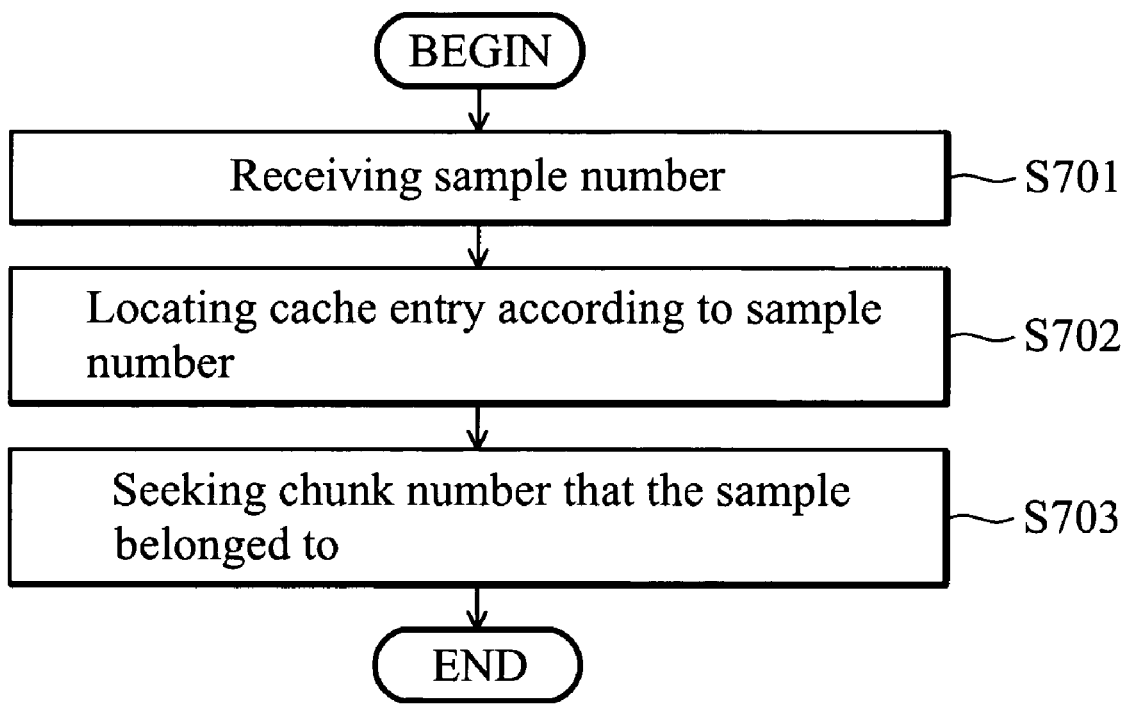
FIG. 7 is a flowchart showing another embodiment of a data processing method.

FIG. 7 is a flowchart showing another embodiment of a data processing method. In this embodiment, a STSC box is used as an example, rather than a limitation to the invention. To locate a sample with a sample number received in step S701, in step S702, one of the cache entries is firstly located using some search technique. In this embodiment, binary search is used as an example, rather than a limitation to the invention. In step S703, after locating the cache entry, the method of the present invention only needs to search through the group corresponding to the cache entry for the target chunk number. It is understood that if the sample is sought for playback, related information of the sample is further retrieved from a sample description table (STSD) according to a corresponding sample description index of the located chunk number.

Data processing methods, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those skilled in this technology can still make various alterations and modifications without departing from the scope and spirit of this invention. Therefore, the scope of the present invention shall be defined and protected by the following claims and their equivalents.

What is claimed is:

1. A data processing method for accessing a target sample in a media data stream, the media data stream having a plurality of samples, the method comprising:
providing at least one time to sample box (STTS) listing entries and the corresponding sample information, the sample information comprises a decoding time of samples in the corresponding entry;
providing at least one sample to chunk box (STSC), comprising chunks of the media data stream, and the sample information comprises the number of samples in respective chunks;
providing target sample information corresponding to the target sample, wherein the target sample information comprises a specific decoding time, and the sample information for a predetermined number is calculated and the calculated result is stored in at least one cache entry;
locating one of the cache entries by comparing the target sample information with the calculated result of respective cache entries; and
after locating the cache entry, locating the target sample from the entries corresponding to the located cache entry.

2. The method of claim 1 further comprising determining the number of the cache entries according to the number of the entries.

3. The method of claim 1 further comprising calculating the sample information for the respective predetermined number of the entries during playback of the media data stream.

4. The method of claim 1, further specifying the specific decoding time between an accumulated time duration recorded in the cache entries prior to the located cache entry and an accumulated time duration recorded in the located cache entry, wherein a sum of the time duration of samples from the first cache entry to the located one equals or exceeds the specific decoding time.

5. The method of claim 1, further specifying number of the target sample between an accumulated number of samples recorded in the cache entries prior to the located cache entry and the accumulated number of samples recorded in the located cache entry, wherein a sum of the number of samples from the first cache entry to the located one equals or exceeds the target sample number.

6. The method of claim 1, further providing a MPEG-4 file as the media data stream.

7. A computer-readable storage medium comprising a computer program, which, when executed, causes a device to perform a data processing method for accessing a target sample in a media data stream, the media data stream having a plurality of samples, the method comprising:
providing target sample information corresponding to the target sample, wherein, wherein the target sample information comprises a specific decoding and the sample information for a predetermined number is calculated and the calculated result is stored in at least one cache entry;
providing at least one time to sample box (STTS) listing the entries and the corresponding sample information, the sample information comprises a decoding time of samples in the corresponding entry;
providing at least one sample to chunk box (STSC), comprising chunks of the media data stream, and the sample information comprises the number of samples in respective chunks;
locating one of the cache entries by comparing the target sample information with the calculated result of respective cache entries; and
after locating the cache entry, locating the target sample from the entries corresponding to the located cache entry.

8. The storage medium of claim 7 wherein the method further comprising determining the number of the cache entries according to the number of the entries.

9. The storage medium of claim 7 wherein the method further comprising calculating the sample information for the respective predetermined number of the entries during playback of the media data stream.

10. The storage medium of claim 7, further specifying the specific decoding time between an accumulated time duration recorded in the cache entries prior to the located cache entry and an accumulated time duration of the located cache entry, wherein a sum of the time duration of samples from the first cache entry to the located one equals or exceeds the specific decoding time.

11. The storage medium of claim 7, further specifying number of the target sample between an accumulated number of samples recorded in the cache entries prior to the located cache entry and an accumulated number of samples recorded in the located cache entry, wherein a sum of the number of samples from the first cache entry to the located one equals or exceeds the target sample number.

12. The storage medium of claim 7 wherein the media data stream is of a MPEG-4 file.

13. A data processing system, comprising:
an interface receiving a media data stream comprising a plurality of samples;
a storage device storing at least one cache entry storing a calculated result of the sample information for a predetermined number, storing at least one time to sample box (STTS) listing the entries and the corresponding sample information, the sample information comprises a decoding time of samples in the corresponding entry, and storing at least one sample to chunk box (STSC), comprising chunks of the media data stream, and the sample information comprises the number of samples in respective chunks; and
a processing unit receiving target sample information corresponding to a target sample, locating one of the cache entries by comparing the target sample information with the calculated result of respective cache entries, and after locating the cache entry, locating the target sample from the entries corresponding to the located cache entry, wherein the target sample information comprises a specific decoding time.

14. The system of claim 13 wherein the processing unit further determines the number of the cache entries according to the number of the entries.

15. The system of claim 13 wherein the processing unit further calculates the sample information for the respective predetermined number of the entries during playback of the media data stream.

16. The system of claim 13, wherein the storage device further stores the specific decoding time, which is between an accumulated time duration recorded in the cache entries prior to the located cache entry and an accumulated time duration recorded in the located cache entry, wherein a sum of the time duration of samples from the first cache entry to the located one equals or exceeds the specific decoding time.

17. The system of claim 13, wherein number of the target sample is between an accumulated number of samples recorded in the cache entries prior to the located cache entry and an accumulated number of samples recorded in the located cache entry, wherein a sum of the number of samples from the first cache entry to the located one equals or exceeds the target sample number.

18. The system of claim 13, wherein the data source further provides a MPEG-4 file as the media data stream.

19. The system of claim 13 wherein the data processing system is a MPEG-4 file decoder.

* * * * *